United States Patent Office 2,969,959
Patented Jan. 31, 1961

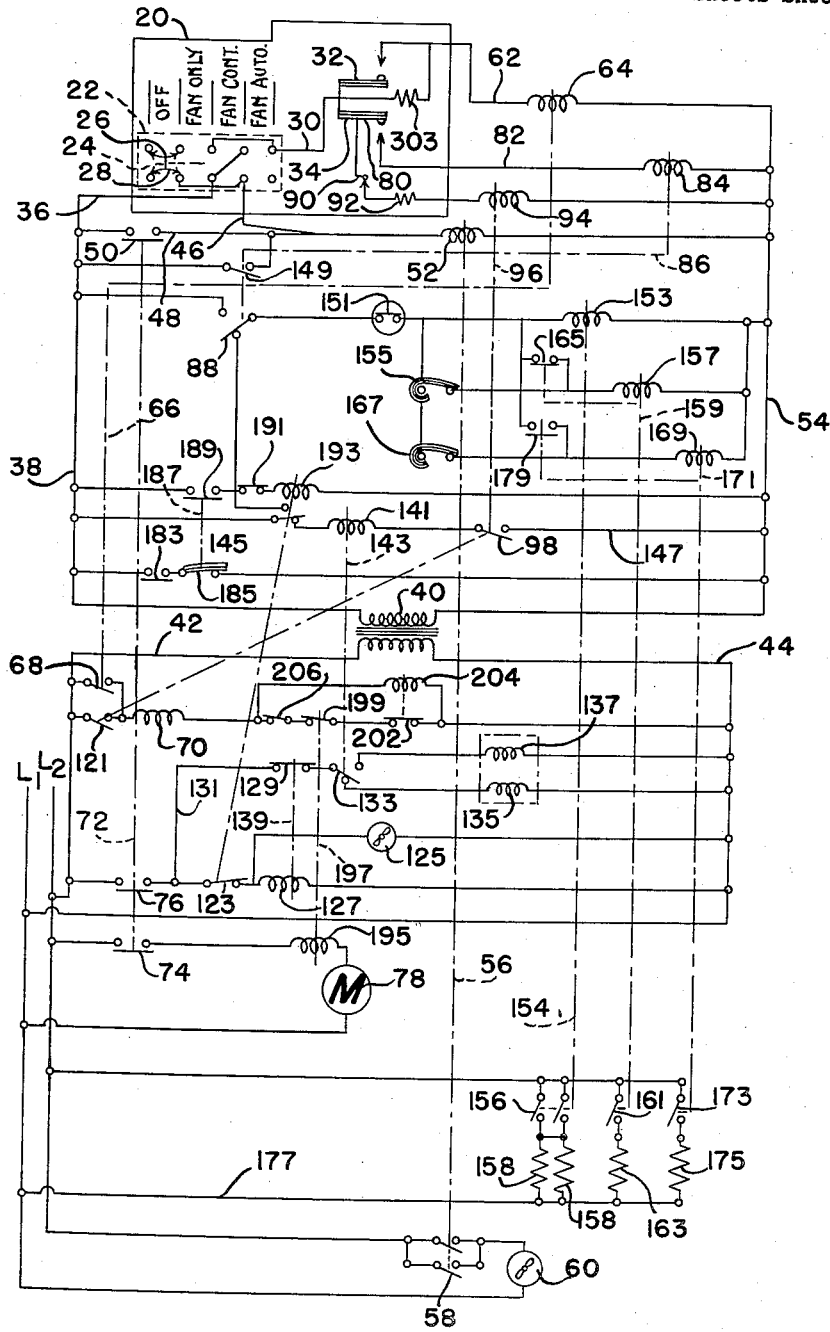

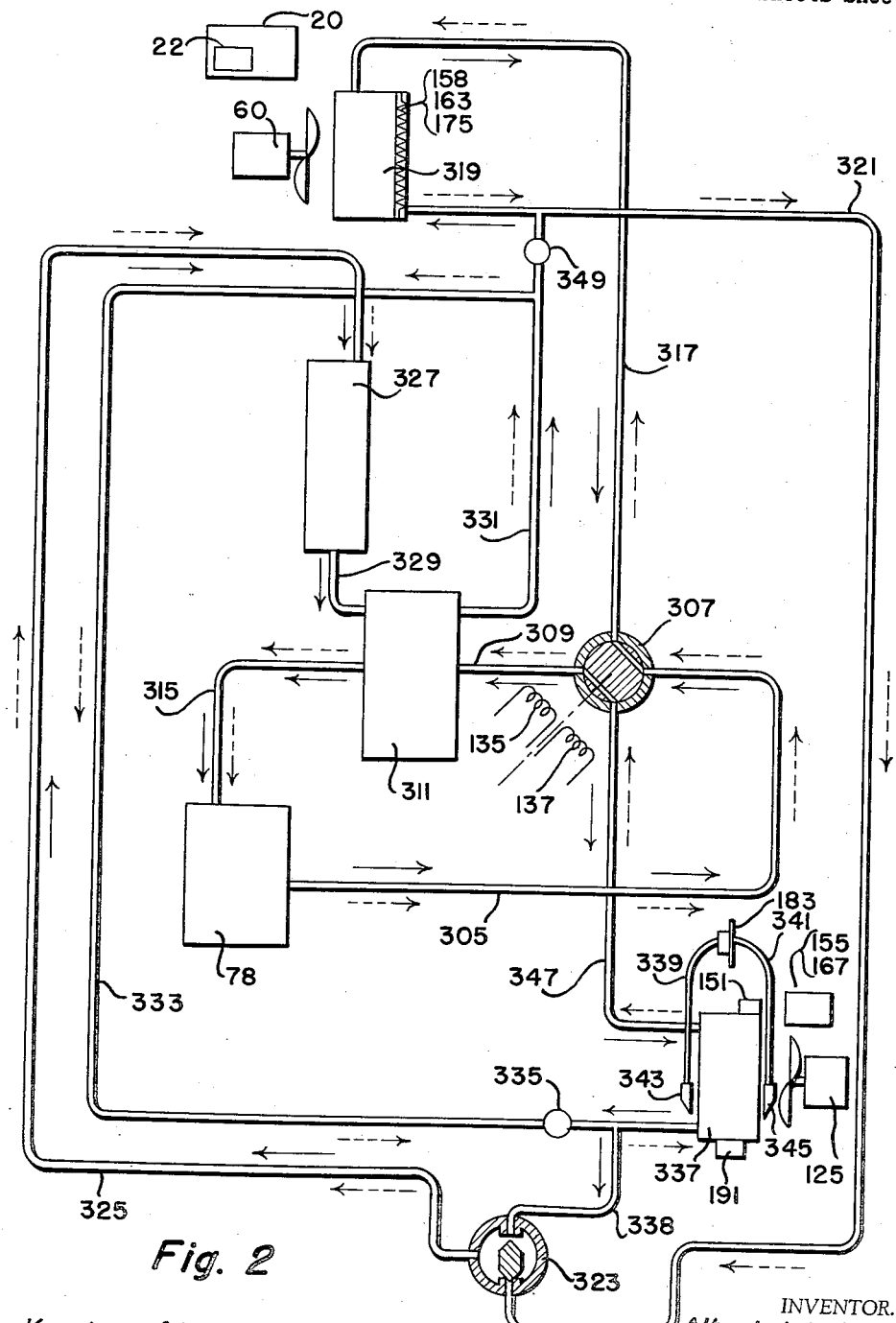

2,969,959

REFRIGERATING APPARATUS

Albert J. Kuhn and David D. Rector, Dayton, Ohio, assignors to General Motors Corporation, Detroit, Mich., a corporation of Delaware Filed Jan. 11, 1957, Ser. No. 633,692

1 Claim. (Cl. 257—278)

This invention relates to refrigerating apparatus and more particularly to controls for making it possible to take full advantage of a refrigerating system for supplying suitable cooling and heating to satisfy all demands for comfort.

One of the problems in refrigerating systems for both their cooling and heating is to provide controls so simple and foolproof that anyone can obtain the comfort condition desired.

It is an object of this invention to provide a single simple control for such a system which will provide the user with all the selection needed or desired such as shut off, continuous fan only, cycling fan and system and continuous fan and cycling system.

Another problem is the frosting of the outside heat transfer unit during heating. If the auxiliary heat for the inside unit is provided by an outside temperature control most conveniently located in or adjacent the outside unit, a defrosting cycle provided by reversed operation of the system will not only change the system from heating to cooling but will also shut off the auxiliary heat when it is most needed.

Another object of the invention is to provide a simple means for keeping on the auxiliary heat during the defrosting cycle in such a system.

Where the motor compressor unit is located outside the building, it is most convenient to confine the overload protector to such a unit. In such units it is often undesirable to provide an automatically resetting overload protector.

It is therefore another object of this invention to provide a manually reset overload associated with such a unit which can be manually reset merely by the operation of the customary on and off switches located at a more convenient place.

These and other objects are obtained in the reversible refrigerating and control system shown in the drawings in which a simple double pole four position selector switch provides positions for off, fan only, fan continuous with cycling refrigeration and fan cycling with the system. This selector switch connects to a multiple thermostatic switch having one thermostatic control for indoor cooling and a two step thermostatic control with one step for reversing the refrigerating system for indoor heating and the second step for bringing in the auxiliary heat on the outside unit.

The auxiliary heat is arranged in three stages. The second and third stages are locked in by switches shunting the thermostat which are provided as additional contacts on the auxiliary heat relays controlled by the outside thermostats. The main refrigerator motor contactor operating coil is connected in series with an electromagnetic overload protector and a low and high pressure cutout switch having their contacts shunted by a circuit which includes the operating coil of an electrically operated switch having its contacts connected in series with the protector and a low and high pressure cutout switch. This makes the motor contactor manually resettable by the return of the four position switch to the off position.

Further objects and advantages of the present invention will be apparent from the following description, reference being had to the accompanying drawings wherein a preferred form of the present invention is clearly shown.

In the drawings:

Figure 1 is a wiring diagram embodying our invention as applied to a reversible refrigerating system; and Figure 2 is a diagrammatic view of the reversible refrigerating system used for air conditioning to which the wiring diagram is applied.

*The selector switch*

Referring now particularly to Figure 1 there is shown diagrammatically a control panel 20 adapted to be located in the room or house to be cooled and heated as necessary for proper comfort conditions. This control panel 20 includes a four position selector switch 22 illustrated diagrammatically by a box-shaped dotted outline containing a slidable double pole member 24 provided with an upper bridging contact 26 and a lower bridging contact 28. These contacts 26 and 28 are adapted to bridge the adjacent contacts in the successions of five upper contacts and five lower contacts. The third and fifth upper contacts are connected together and connected by a conductor 30 to the cooling thermostat 32 and to the two step heating thermostat 34. The fourth upper contact and the third lower contact are connected together and to the conductor 36 connecting to the supply conductor 38 which in turn connects to one of the lower voltage terminals of the transformer 40. The input high voltage terminals of the transformer 40 are connected by the conductors 42 and 44 to the 230 volt supply conductors L2 and L1. The lower second and fourth contacts of the selector switch 22 are connected together and also connected by the conductor 46 to the conductor 48 extending from the bridging contact 50 through a solenoid operating coil 52 to the second low voltage output conductor 54 of the transformer 40.

The bridging contact 50 also connects to the supply conductor 38. The solenoid operating coil 52 through the operating connection 56, shown diagrammatically with the double pole switch 58, controls the indoor motor fan 60 by connecting and disconnecting one terminal of the fan 60 with the supply conductor L2. The second terminal of the fan 60 is connected directly to the supply conductor L1.

*The thermostat control*

The cooling thermostat 32 connects through the conductor 62 to the electromagnet coil 64 of the cooling relay which in turn connects to the conductor 54. The electromagnet coil 64 is provided with an operating connection 66 diagrammatically indicated by a dot and dash line. This operating connection 66 connects to the cooling relay switch 68 connecting the supply conductor L2 with the motor solenoid 70 of the motor contactor. The motor solenoid 70 is provided with an operating connection 72, shown diagrammatically by a dot and dash line, so that when it is energized it will simultaneously close the motor contactor switch 74, the outside fan switch 76 and the indoor fan switch 50. The switch 74 is connected to the line L2 and the compressor motor 78. A second terminal of the compressor motor 78 is connected to the supply conductor L1. The switch member 50 when closed connects the solenoid 52 with the low voltage supply conductor 38.

The heating thermostat 34 is provided with a first step switch 90 connecting in series with an anticipating heater 92 and with the solenoid operating coil 94 of the heating relay which in turn is connected to the low voltage supply conductor 54. This solenoid operating coil 94 of the heating relay is connected by the operating member 96, illustrated by dot and dash lines, to the switch 98 and the switch 121 which is in parallel with the switch 68 and likewise serves to connect the operating coil 70 with the supply conductor L2.

The switch 76 connects the supply conductor L2 to a multiple circuit which includes one of the switches 123 of the defrosting circuit. This switch 123 connects to the outdoor fan 125 as well as to the time delay operating solenoid coil 127 connected through parallel circuits to the supply conductor 44 which in turn connects to the supply conductor L1. The outdoor fan 125 circulates outdoor air into heat exchange relationship with the outdoor heat transfer unit. The solenoid coil 127 when energized, after a time delay acts to open the switch contacts 129 in a circuit parallel to the switches 123 and the solenoid 127 and the outdoor fan motor 125. This switch 129 when momentarily closed connects the conductor 131 connecting with the switch 76 to a double throw heating-cooling selector switch 133 which is normally in the lower cooling position connecting with the cooling solenoid 135 in turn connecting with the supply conductor 44. The switch 133 also has an upper heating position connecting with the heating solenoid 137. These solenoids are merely momentarily energized so as to move the reversing valve 307 of the refrigerating system shown in Figure 2 to either the heating or cooling position. After this, these solenoids are deenergized after a time delay by the solenoid operating coil 127 which is connected by the connection 139 shown diagrammatically by dot and dash lines with the switch 129 to open the switch 129. The switch 129 will then remain open until either the switches 123 or 76 reopen.

The closing of the switch 121 causes the closing of the switches 50, 74 and 76 which are also closed by the closing of the switch 68. In addition, the simultaneous closing of the switch 98 causes the energization of the operating solenoid 141 provided with an operating connection 143, shown diagrammatically as a dot and dash line, with the double throw heating-cooling selector switch 133. Also connected in series with the selector switch operating coil 141 is a double throw defrosting switch 145 normally closed to connect the solenoid 141 with the supply conductor 38. The switch 98 connects the solenoid 141 through the conductor 147 to the low voltage supply conductor 54. Thus during the closed periods of the switch 90 the solenoids 94 and 141 are energized to momentarily energize the solenoid 137 to cause the inside unit 319 to heat and the outside unit 337 to become cold.

*The auxiliary heat system*

When the operation of the refrigerating system alone is insufficient to keep the room or house warm, the second step switch 80 will also close to energize the solenoid 84 and to close the fan switch 149 connected in shunt with the switch 50 to energize the fan solenoid 52 to assure operation of the inside fan 60. The closing of the switch 149 insures that the fan 60 will operate whenever the auxiliary heat is on even though the motor contactor 70—74 should open. The solenoid 84 also acts to move the double throw switch 88 from its normal lower position in which it connects to the defrost control switch 189 to its upper position connecting directly with the supply conductor 38. In its upper position, the switch 88 connects the conductor 38 through a high temperature cut out switch 151 through the first solenoid operating coil 153 of the auxiliary heat system which in turn connects to the supply conductor 54. The energization of the operating coil 153 acts through an operating member 154, illustrated diagrammatically by dot and dash lines, to close the double pole switch 156 to connect the first stage heaters 158 to the supply conductor L2. The other terminals of the heaters 158 are connected through the conductor 177 to the supply conductor L1.

Also connected to this high temperature cut out 151 is a first outside thermostat 155 which closes when the outside temperature falls below a certain value such as 20° F. This first outside thermostat 155 connects to the second solenoid operating coil 157 of the auxiliary heat system likewise connecting with the supply conductor 54. The solenoid operating coil 157 has an operating member 159 designated by dot and dash lines for closing the second auxiliary heater switch 161 providing a connection between the supply conductor L2 and the second stage auxiliary heater 163 which in turn connects through the conductor 177 to the supply conductor L1. The energization of the coil 157 also acts to close the contacts 165 which shunts the thermostatic switch 155 so as to prevent the heater 163 from being deenergized during a defrosting period.

The high temperature cut out 151 also connects to a second outdoor thermostat 167 closing at a lower temperature (such as 10° F.) than the switch 155. This second outdoor thermostat 167 provides a connection between the high temperature cut out 151 and the third auxiliary heater operating solenoid 169 connecting with the supply conductor 54. The operating solenoid 169 operates an operating member 171, shown diagrammatically by a dot and dash line, connecting with the third auxiliary heat switch 173 providing a connection between the supply conductor L2 and the third stage auxiliary heater 175. This heater 175 is also connected by the conductor 177 with the supply conductor L1. The operating member 171 also has an additional connection to close the normally open switch contacts 179 to shunt the outside thermostat 167 so as to prevent the deenergizing of the heater 175 during any defrosting cycle.

*Defrosting*

The defrosting is initiated by the increase in the pressure drop of the air flowing through the outdoor heat transfer coil 337. When the pressure drop becomes sufficiently great, the defrost pressure switch 183 closes to connect the supply conductor 38 through a time delay operating mechanism 185 to the supply conductor 54. The purpose of the time delay operating mechanism is to prevent gusts of wind from causing an effect which would cause the initiation of a defrosting cycle when there is substantially no frost on the outside coil. As a result, momentarily closing of the switch 183 will not affect the delayed operating mechanism 185 sufficient to cause its operation. The delayed operating mechanism of the switch 185 acts through an operating connection 187 to close the switch 189. The switch 189 connects the supply conductor 38 through a defrost limit switch 191 to the defrost operating coil 193. The defrost solenoid operating coil 193 acts to operate the double throw defrost selector switch 145 from its lower normal operating position to its upper defrosting position providing a connection with the defrost solenoid operating coil 193 and shunting the air flow responsive switch contacts 189 to insure the continuing of the defrosting cycle once it is initiated until it is terminated by the opening of the defrost limit switch 191 responsive to the pressure in the outside coil 337. The defrost pressure switch 183 will naturally open as soon as air begins to flow freely through the outdoor coil 337.

The moving of the defrost switch 145 to its upper position deenergizes the selector operating coil 141 causing the switch 133 to move downwardly to deenergize the heating coil 137 and to reenergize the cooling coil 135. The operating coil 193 also opens the switch 123 to stop the operation of the outdoor fan 125 and incidentally to deenergize the operating coil 127. This recloses contact 129 thus providing a current flow to solenoid 135 since the switch 133 has been lowered. This results in the warming and defrosting of the outdoor heat transfer unit until the defrost limit switch 191 opens at a high enough pressure to insure defrosting thereby deenergizing the solenoid operating coil 193. When this defrost coil 193 is deenergized, the switch 145 moves to its lower position and the switch 123 is reclosed. The selector coil 141 is reenergized to move the heating-cooling selector switch 133 to its upper position to deenergize the cooling coil 135 and to reenergize the heating coil 137 to resume the heating cycle.

*The overload protector*

The circuit of the compressor motor 78 has connected in it the solenoid operating coil 195 of an overload protector relay having an operating member 197 for opening the protector switch contacts 199 to deenergize the motor contactor 70. This deenergization of the motor contactor 70 will allow the switches 50, 74 and 76 to open to stop the compressor motor 78, the indoor fan motor 60 (provided switch 22 is in the fan automatic position) and the outdoor fan motor 125. Connected in series with the protector contacts 199 is a second normally closed high pressure cutout switch 206 and a third normally closed switch 202. This normally closed switch 202 is a part of an electromagnet switch having its operating coil 204 connected in shunt with the switches 199 and 202. If either the switches 199 or 206 are opened while the motor is in operation, current will flow through the solenoid coil 204 to open the switch 202. This current flow will continue to hold open the switch 202 until the circuit is deenergized. This switch 202 will keep the motor contactor 70 deenergized until someone manually moves the selector switch 22 back to the off position or the fan only position to deenergize the coil 204 to reclose the switch 202. Normal operation is resumed merely by moving the four position selector switch 22 back to either the fan continuous position or the fan automatic position. The return of the selector switch to the fan continuous or the fan automatic position will cause the reclosing of either the switch 68 or the switch 121 to cause resumption of the normal use of the system.

*The refrigerating system*

Referring now more particularly to Figure 2, the reversible refrigerating system includes a motor compressor unit 78 having its discharge port connected by the conduit 305 with the four way reversing valve 307 which is shown in the heating position. This valve 307 is moved to the heating position by the solenoid operating coil 137 and is turned 90° clockwise to the cooling position by the solenoid coil 135. The reversing valve 307 is connected by the suction conduit 309 through a heat exchanger 311 and a conduit 315 with the suction inlet port of the motor compressor unit 78.

The four way reversing valve 307 has one connecting conduit 317 connecting with one connection of the indoor heat transfer unit 319. The indoor motor fan 60 circulates indoor air in heat transfer relation with the indoor unit 319. The indoor unit 319 has a second connection connected by a conduit 321 with a two way check valve 323. This two way check valve 323 is moved up when the fluid is delivered from the conduit to seal off its upper outlet and to provide a connection with the conduit 325 extending to the receiver 327. The bottom of the receiver 327 discharges through the conduit 329, the heat exchanger 311 and the conduits 331 and 333 to an expansion valve 335 controlling the flow of refrigerant into the outdoor heat transfer unit 337. The outdoor motor fan unit 125 circulates air through this outdoor heat transfer unit 337. This outdoor heat transfer 337 is also provided with the outdoor thermostats 155 and 167.

Also associated with the outdoor heat transfer unit is the defrost pressure switch 183 having a diaphragm chamber connected by the tubes 339 and 341 to orifices 343 and 345 located on opposite sides of the outdoor unit 337. When there is no obstruction to air flow through the unit 337, the pressure difference at the orifices is small and the defrost pressure switch will remain open. When the outdoor unit 337 collects frost there will be increasing obstruction to flow of air through the unit 337. This will cause a greater difference in the pressure of the air at the orifices 345 and 343 so as to actuate the defrost pressure switch to cause the initiation of the defrost cycle. The defrost cycle will continue until the defrost limit switch 191 located at the bottom of the unit 337 reaches a pressure high enough to indicate that the unit 337 has defrosted. Associated with the indoor unit 319 is the high temperature cutout 151 for the auxiliary heaters 158, 163 and 175 which will open at a suitable high temperature to prevent overheating.

The second connection of the outdoor unit 337 is connected by the conduit 347 with the four way reversing valve 307. A second expansion valve 349 is connected between the conduits 331 and 321 for controlling the flow of refrigerant from the heat exchanger 311 to the indoor unit 319 during the refrigerating cycle.

*Operation*

In operation, if it is only desired to operate the indoor fan 60 the slidable selector contactor 24 is moved from the off position to the fan only position wherein the lower contact 28 connects the conductor 36 with the conductor 46 to energize the solenoid 52 to close the switches 58 to connect the fan 60 across the supply conductors L1 and L2.

If it is desired to operate the fan 60 continuously and to cycle the refrigerating system the selector 24 is moved to the fan continuous position in which the contact member 28 again connects the conductors 36 and 46 to again energize the solenoid 52 and to close the switches 58. However in this position the contactor 26 bridges the conductors 36 and 30 so as to operatively connect the thermostatic switches 32, 80 and 90 to the conductor 38.

*Cooling Operation*

If the room is too warm, the switch 32 will be closed to energize the solenoid operating coil 64 to close the switch 68 to energize the compressor motor solenoid 70. The energization of the compressor motor solenoid 70 will cause the closing of the switches 50, 76 and 74. This will also energize the solenoid 52 to close the switches 58 and operate the indoor fan 60 so that this fan 60 will always operate during the operation of the refrigerating system even if the conductors 36 and 46 are disconnected. The closing of the switch 76 will energize the outdoor fan 125 which blows air through the outdoor heat transfer unit 337. The closing of the switch 76 will energize the cooling solenoid 135 because the switch contacts 133 are in the down position to turn the valve 307 90° clockwise from the position shown in Figure 2. As soon as this is accomplished the time delay electromagnet coil 127 will operate to open the switch 129 to deenergize both the solenoids 135 and 137. This prevents the solenoids 135 and 137 from being substantially continuously energized.

The closing of the switch 74 energizes the motor compressor unit 78. The energization of the motor compressor unit 78 operates to withdraw evaporated refrigerant from the outlet of the indoor heat transfer unit 319 acting as an evaporator through the conduit 317, the four way valve 307, the conduit 309, the heat exchanger 311, and the conduit 315 back to the inlet of the motor compressor unit 78. The compressor 78 pumps the refrigerant through the conduit 305, the four way valve 307, the conduit 347, the outdoor heat transfer unit 337 (serving as a condenser), the conduit 338, the check valve 323, the conduit 325, the receiver 327, the conduit 329, the heat exchanger 311, the conduit 331, the expansion valve 349 and the short portion of the conduit 321 into the indoor unit 319. When the room or house is sufficiently cooled, the bimetal switch 32 will open. This will deenergize the solenoid 64 to open the switch 68 which in turn will deenergize the solenoid 70 to open the switches 50, 76 and 74. The fan 60 however will continue to operate since the solenoid 52 will remain energized by the contacts 28 bridging the conductors 36 and 46. The opening of the thermostat 32 will cause the energization of an anticipating heater 303 which shunts the contacts and the application of its heat hastens the reclosing of the contacts 32. As long as the warm weather outdoors continues, the system will continue to cycle to maintain suitable temperature within the room.

The outdoor fan 125 will always cycle with the motor compressor unit since the switches 74 and 76 are simultaneously opened and closed. If the selector 24 is in the fan automatic position, the switch contact 50 which opens and closes with the switches 74 and 76, will control the energization of the solenoid 52. Thus in this position the contact 28 will not bridge the conductors 36 and 46 but the solenoid 52 can only be connected to the supply conductor 38 by the switch 50.

Heating operation

If the weather outdoors should turn cold, the switch 32 will open and the first step heating switch contacts 90 will be closed. This will cause the energization of the solenoid 94 and the closing of the switches 98 and 121. The closing of the switch 98 will energize the solenoid 141 to move the heating-cooling selector switch 133 to its upper heating position in which the heating solenoid 137 is momentarily energized to move the four way valve counterclockwise to the position shown in Figure 2. The solenoid 70 will also be energized to close the switches 50, 76 and 74. The closing of the first two switches 50 and 76 will cause the operation of the indoor fan 60 and the outdoor fan 125. The closing of the switch 74 will energize the motor compressor unit 78. By this energization, the motor compressor unit will draw evaporated refrigerant from the outdoor heat transfer unit 337 (now acting as an evaporator) through the conduit 347, the valve 307, the conduit 309, the heat exchanger 311, the conduit 315 and the motor compressor pumps this refrigerant through the conduit 305, the four way valve 307, the conduit 317 through the indoor heat transfer unit 319 (now acting as a condenser), the conduit 321, the three way check valve 322, the conduit 325, the receiver 327, the conduit 329, the heat exchanger 311, the conduit 331, the conduit 333, the expansion valve 335 and the outdoor heat transfer unit 337.

The outdoor heat transfer unit 337 (now acting as an evaporator) will withdraw heat from the outdoor air and by the compression in the motor compressor unit 78 will deliver hot compressed refrigerant to the indoor heat transfer unit 319 where it will condense and liquefy to heat the air within a room or building.

If the refrigerating system is of adequate capacity to keep the room or building warm at the prevailing outdoor temperature the switch 90 will cycle to maintain the proper temperature. The opening of the thermostatic switches 80 and 92 is facilitated by the series connected anticipator resistance 92 connected in series with the contact 90. This cycling will cause the energization and deenergization of the solenoid 94 causing the closing and opening of the switches 98 and 121. This will cause the switches 50, 76 and 74 to cycle and to cycle the motor compressor unit 78, the outdoor fan 125 and the indoor fan 50 if the selector 22 is in the fan automatic position. If the selector 22 is in the fan continuous position, the indoor fan 60 will operate continuously.

Auxiliary heating

Should the refrigerating system be insufficient to keep the room or house containing the control panel 20 up to a proper temperature, the thermostatic switch 80 will also close. This switch 80 will energize the auxiliary heating relay or solenoid 84 which will close the contacts 149 and 88 to energize the solenoid 52 closing contacts 58 to energize the indoor fan 60 and the solenoid 153 to close the switch contacts 156 to energize the first stage auxiliary heaters 158.

The contacts 80 will open upon a small rise in room temperature to deenergize the auxiliary heating relay 84 to move the contact member 88 downwardly to disconnect the outdoor thermostats 155 and 167 from the supply conductor 38 to deenergize the solenoid 153 to open the switch 156 to deenergize the heaters 158. Further lowering of the outdoor temperature will cause the outdoor thermostat 155 to close to energize the solenoid operating coil 157. The energization of this coil 157 will cause the closing of the second auxiliary contacts 161 to energize the second stage auxiliary heater 163. The energization of the relay 157 causes the resetting of the operating member 159 not only to cause the contacts 161 to energize the heater 163 but also to close the contact 165 so as to shunt the thermostatic switch 155 and cause substantially continuous operation of the heater 163, primarily for the purpose of preventing the cessation of this heat during a defrosting cycle.

Should the outdoor temperature fall still lower, the thermostatic switch 167 will close to energize the solenoid 169 to close the switch 173 and energize the third stage heater 175. The energization of the solenoids 157 and 171 causing the closing of the switches 161 and 173 also causes the closing of the switches 165 and 179. These holding switches 165 and 179 shunt the outdoor thermostats 155 and 167. The opening of the switch 80 upon a rise in room temperature will deenergize the solenoid 84 and allow the opening of the switch 149. This will deenergize the solenoid 52 to stop the indoor fan motor 60. This will also move the double throw switch 88 to its lower position. This will place the solenoids 153, 157 and 171 under the control of the defrost switch 189. If this switch 189 is closed, the heaters 158, 163 and 173 will not be deenergized. If this switch 189 is open, this will momentarily deenergize the solenoids 153, 157 and 169 to cause the holding switches 165 and 167 to reopen. When the thermostat 80 again recloses upon a falling room temperature, the solenoid 84 will again be energized to reclose the switch 149 and to move the selector switch 88 back to its upper position. Thus, during each normal heating cycle the thermostats 155 and 167 will control the resumption of the auxiliary heating according to the outdoor temperature, but the cessation of the auxiliary heating will depend upon the thermostat 80 and the defrost switches 183 and 189.

Should frost impair the flow of air through the outdoor unit 337, the greater pressure built up at the orifice 345 relative to the orifice 343 will cause the closing of the defrost pressure switch 183 to energize the delayed action operating mechanism 185 to close the defrost switch contact 189. This in turn will energize the solenoid 193 to move the double throw switch 145 to its upper defrosting position and to open the switch 123. The opening of the switch 123 will deenergize the outdoor fan motor 125 as well as the solenoid 127. This will insure the closing of switch 129. The movement of the switch 145 to its upper position will deenergize the solenoid 141 to allow the heating-cooling selector switch 133 to move to its lower position for energizing the cooling solenoid 135. This will cause the four way valve 307 to be turned 90° clockwise to cause the indoor unit 319 to cool and the outdoor unit 337 to heat to begin a defrosting cycle. The heating of outdoor unit 337 will continue until the defrost limiter switch 191 reaches a pressure which will insure that the unit 337 has completely defrosted. The opening of the switch 191 will deenergize the defrost solenoid coil 193 to allow the defrost selector switch 145 to return to its lower position and also to close the switch 123. The closing of the switch 123 will allow the resumption of operation of the outdoor fan 125. The movement of the switch 145 to its lower position will reenergize the solenoid 141 to move the heating-cooling selector switch 133 back to its upper position to deenergize the cooling coil 135 and to reenergize the heating coil 137. This will restore the normal heating of the system which will continue as long as the indoor or room temperature requires heating or until defrosting is again required.

While the form of embodiment of the invention as herein disclosed constitutes a preferred form, it is to be understood that other forms might be adopted, as may come within the scope of the claim which follows.

What is claimed is as follows:

Air conditioning apparatus including a first heat transfer unit exposed to outdoor air and a second heat transfer unit exposed to indoor air, motor compressor means for withdrawing refrigerant from one of said units and delivering it to the other unit, refrigerant flow control means connected between said units, a reversing valve connected between said units and said motor compressor means to cause either of said units to heat or cool, a source of electrical energy, electric auxiliary heating means for said second unit, thermostatic switch means adjacent said first unit having first means responsive to low environment temperatures for closing and connecting said auxiliary means to said source and responsive to high environment temperatures for opening and disconnecting said auxiliary means from said source, said first means including a normally open electrically operated switch having its switch contacts connected in shunt circuit with said thermostatic switch means and having its electrical operating element connected in series with both said switch contacts and said thermostatic switch means for preventing the discontinuance of the auxiliary heat, means effective when said second unit is heating and said first unit is cooling for operating said reversing valve to cause said first unit to heat and be defrosted, and means for deenergizing said electrical operating element to open its switch contacts, a second auxiliary heating means for said second unit, a second thermostatic switch means adjacent said second unit having a second means responsive to lower environment temperatures than said first mentioned thermostatic switch means for closing and connecting said second auxiliary means to said source and responsive to high environment temperatures for opening and disconnecting said auxiliary means from said source, said second means including a second normally open electrically operated switch having its switch contacts connected in shunt circuit with said second thermostatic switch means and having its electrical operating element connected in series with both its switch contacts and said thermostatic means for preventing the discontinuance of heating of said second auxiliary heating means, said means for deenergizing said electrical operating element of said first mentioned electrically operated switch also deenergizing said operating element of said second electrically operated switch to open its switch contacts.

References Cited in the file of this patent

UNITED STATES PATENTS

| | | |
|---|---|---|
| 2,083,436 | De Bothezat | June 8, 1937 |
| 2,389,073 | Newton | Nov. 13, 1945 |
| 2,412,981 | Harrold | Dec. 24, 1946 |
| 2,481,469 | Brown | Sept. 6, 1949 |
| 2,672,734 | Ditzler et al. | Mar. 23, 1954 |
| 2,714,293 | Duncan | Aug. 2, 1955 |
| 2,778,197 | Legeza | Jan. 22, 1957 |
| 2,806,674 | Biehn | Sept. 17, 1957 |
| 2,847,190 | Slattery et al. | Aug. 12, 1958 |